US011905741B2

(12) United States Patent
Arens et al.

(10) Patent No.: US 11,905,741 B2
(45) Date of Patent: Feb. 20, 2024

(54) RELEASABLE LOCKING MECHANISM FOR A REFRIGERATED APPLIANCE

(71) Applicant: Haier US Appliance Solutions, Inc., Wilmington, DE (US)

(72) Inventors: Elaine Marie Arens, Louisville, KY (US); Bart Andrew Nuss, Fisherville, KY (US); Ryan Persaud, Louisville, KY (US); Ronald Fernandez, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 105 days.

(21) Appl. No.: 17/110,384

(22) Filed: Dec. 3, 2020

(65) Prior Publication Data

US 2022/0178173 A1 Jun. 9, 2022

(51) Int. Cl.

| | |
|---|---|
| ***E05B 65/00*** | (2006.01) |
| ***E05B 47/00*** | (2006.01) |
| ***G07C 9/21*** | (2020.01) |
| ***E05B 15/02*** | (2006.01) |
| ***E05B 63/00*** | (2006.01) |

(Continued)

(52) U.S. Cl.
CPC .......... *E05B 65/005* (2013.01); *E05B 15/022* (2013.01); *E05B 47/0012* (2013.01); *E05B 63/0017* (2013.01); *E05B 63/244* (2013.01); *E05B 65/0042* (2013.01); *G07C 9/21* (2020.01); *E05B 53/005* (2013.01)

(58) Field of Classification Search
CPC ............. E05B 65/0053; E05B 65/0042; E05B 63/0017; E05B 15/022; E05B 55/00; E05B 55/003; E05B 55/005; E05B 47/0012; E05B 81/90; E05B 65/025; E05B 65/005; E05B 63/18; E05B 63/24; E05B 63/244; E05B 63/246; E05B 63/0065; Y10S 292/71; Y10S 292/65; Y10T 70/5097; Y10T 70/5102; Y10T 70/5106; Y10T 70/5111; Y10T 292/696; Y10T 292/54; Y10T 292/546; F25D 23/02; F25D 23/028; E05C 19/18; E05C 19/182; E05C 19/184; E05C 19/188; E05C 17/02; E05C 17/04; E05C 17/12
See application file for complete search history.

(56) References Cited

U.S. PATENT DOCUMENTS 2,743,953 A * 5/1956 Maria, V .............. E05B 63/246 292/341.18
3,713,681 A 1/1973 Worley
(Continued)

FOREIGN PATENT DOCUMENTS

EP 0877136 A2 11/1998
FR 2516581 A1 * 5/1983 ............. E05C 9/047
(Continued)

*Primary Examiner* — Christine M Mills
*Assistant Examiner* — Peter H Watson
(74) *Attorney, Agent, or Firm* — Dority & Manning, P.A.

(57) ABSTRACT

A releasable locking mechanism for a refrigerated unit. A latch plate is movable between a position that can be engaged by a deadbolt and a position clear of the deadbolt. The latch plate is moved by a door release accessible from an interior of the refrigerated unit. When the door release is activated, a pin blocks movement of the latch plate so that the refrigerated unit remains unlocked until the pin is reset.

14 Claims, 7 Drawing Sheets

(51) Int. Cl.
*E05B 63/24* (2006.01)
*E05B 53/00* (2006.01)

(56) References Cited

U.S. PATENT DOCUMENTS

| | | | | |
|---|---|---|---|---|
| 4,904,007 | A | 2/1990 | Woodruff | |
| 5,603,534 | A * | 2/1997 | Fuller | E05B 55/005 292/42 |
| 6,199,922 | B1 * | 3/2001 | Kibble | E05B 63/18 292/DIG. 52 |
| 6,247,732 | B1 | 6/2001 | Alton | |
| 6,259,352 | B1 * | 7/2001 | Yulkowski | E05C 17/56 70/277 |
| 6,364,379 | B1 | 4/2002 | Roberts et al. | |
| 6,866,311 | B2 | 3/2005 | Spurr et al. | |
| 10,520,242 | B2 | 12/2019 | Denison et al. | |
| 2008/0106104 | A1 * | 5/2008 | Lin | E05B 63/0065 292/92 |
| 2012/0106065 | A1 * | 5/2012 | Yu | E05C 1/02 292/96 |

FOREIGN PATENT DOCUMENTS

| | | | | |
|---|---|---|---|---|
| FR | 2845109 | A1 * | 4/2004 | A47G 29/1201 |
| KR | 101755219 | B1 * | 7/2017 | E05B 81/90 |
| WO | WO-2016168538 | A1 * | 10/2016 | E05B 15/0006 |

* cited by examiner

RELEASABLE LOCKING MECHANISM FOR A REFRIGERATED APPLIANCE

FIELD OF THE INVENTION

The subject matter of the present disclosure relates generally to a releasable locking mechanism that can be used with a refrigerated appliance.

BACKGROUND OF THE INVENTION

Given the rise in food and grocery delivery services, temperature-controlled and access-secure delivery appliances are desirable to permit deliveries when the consumer is not home. For example, delivery appliances may be positioned externally of a residence or built into an exterior wall of a residence. The entire interior space of the appliance may be refrigerated or may have a climate control system for regulating the temperature within a storage compartment positioned within a cabinet of the delivery appliance. The appliance may be portable or permanently installed. Regardless of the configuration, the appliance can allow the consumer to receive delivery of food orders and maintain such food at the desired storage temperature, even while not at home. The user or the delivery service can set a temperature of the delivery appliance as desired to avoid spoiling of perishable food items or to otherwise prevent degradation of the quality of the food that might otherwise occur if the food were stored in an uncontrolled environment. The user can then access the food items as desired at a time subsequent to delivery.

In order to maintain the security of such food items by preventing tampering or theft, the refrigerated appliance may be provided with security features including a lock or features that allow a lock to be deployed. The lock may be controlled manually, electronically, or both. The delivery service may be provided with access, e.g. a key or code, so that food items can be delivered and then locked in the refrigerated appliance for access later by the user. The lock may be operated automatically once the door has been closed.

Refrigerated appliances are typically air-tight so as to prevent refrigerated air from escaping into the environment. For energy efficiency, doors are provided with features that seal off the exchange of air between the interior and exterior when closed. This allows refrigerated air to be circulated within the appliance while minimizing heat exchange with the environment.

Unfortunately, due to the airtight seal needed for energy efficiency, a person can create a dangerous risk of suffocation by entering the refrigerated appliance and allowing the door to close. For at least this reason, refrigerated appliances may be provided with a safety mechanism for opening the door from inside the appliance. A latch or other release can be positioned inside the appliance in a location that is accessible to a person trapped inside.

Accordingly, a refrigerated appliance with a locking mechanism to prevent tampering or theft would be useful. Such a locking mechanism that includes features that allow the locking mechanism to be overridden as part of a safety mechanism that opens the door from inside the unit would be particularly desirable. Features that maintain the locking mechanism in an unlocked position until the lock is reset would also be beneficial.

BRIEF DESCRIPTION OF THE INVENTION

In one exemplary embodiment, the present invention provides a refrigerated unit having a cabinet and forming an opening for access to an interior space. A door is supported by the cabinet and is configured for allowing selective access by movement of the door between an open position and a closed position. A locking mechanism provides for securing the door in the closed position, the locking mechanism includes a deadbolt movable along a lock axis between a retracted position and an extended position, the deadbolt preventing opening of the door when in the extended position. A latch plate is positioned near the deadbolt when the door is in a closed position, the latch plate defining an aperture for receipt of the deadbolt when in the extended position. The latch plate is movable parallel to the lock axis between i) an engaged position where the deadbolt can move along the lock axis in and out of the aperture and ii) a disengaged position where the deadbolt cannot be positioned into the aperture. The locking mechanism also includes a position near the latch plate. The pin is configured for movement between i) an activated state where the latch plate is prevented from moving to the engaged position and ii) a deactivated stated where the latch plate is not prevented from being in the engaged position.

In another exemplary embodiment, a refrigerated unit is provided that includes a cabinet forming an opening for access to an interior space. A door is pivotably supported and configured for selectively covering and uncovering the opening so that the interior space may be accessed. A locking mechanism is included and has a deadbolt movable between a retracted position and an extended position, the deadbolt preventing opening of the door when in the extended position. A latch plate is positioned near the deadbolt when the door is in a closed position. The latch plate defines an aperture for receipt of the deadbolt when in the extended position. The latch plate is movable between i) an engaged position where the deadbolt can move along the lock axis in and out of the aperture and ii) a disengaged position where the deadbolt cannot be positioned into the aperture. A pin is positioned near the latch plate. The pin is configured for movement between an i) activated state where the latch plate is prevented from moving to the engaged position and ii) a deactivated state where the latch plate is not prevented from moving into the engaged position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 8 and 9 are elevation views of the exemplary locking mechanism on the top of the exemplary refrigerated unit with FIG. 8 showing a locked position while FIG. 9 shows an unlocked position.

DETAILED DESCRIPTION OF THE INVENTION

Figure 1:
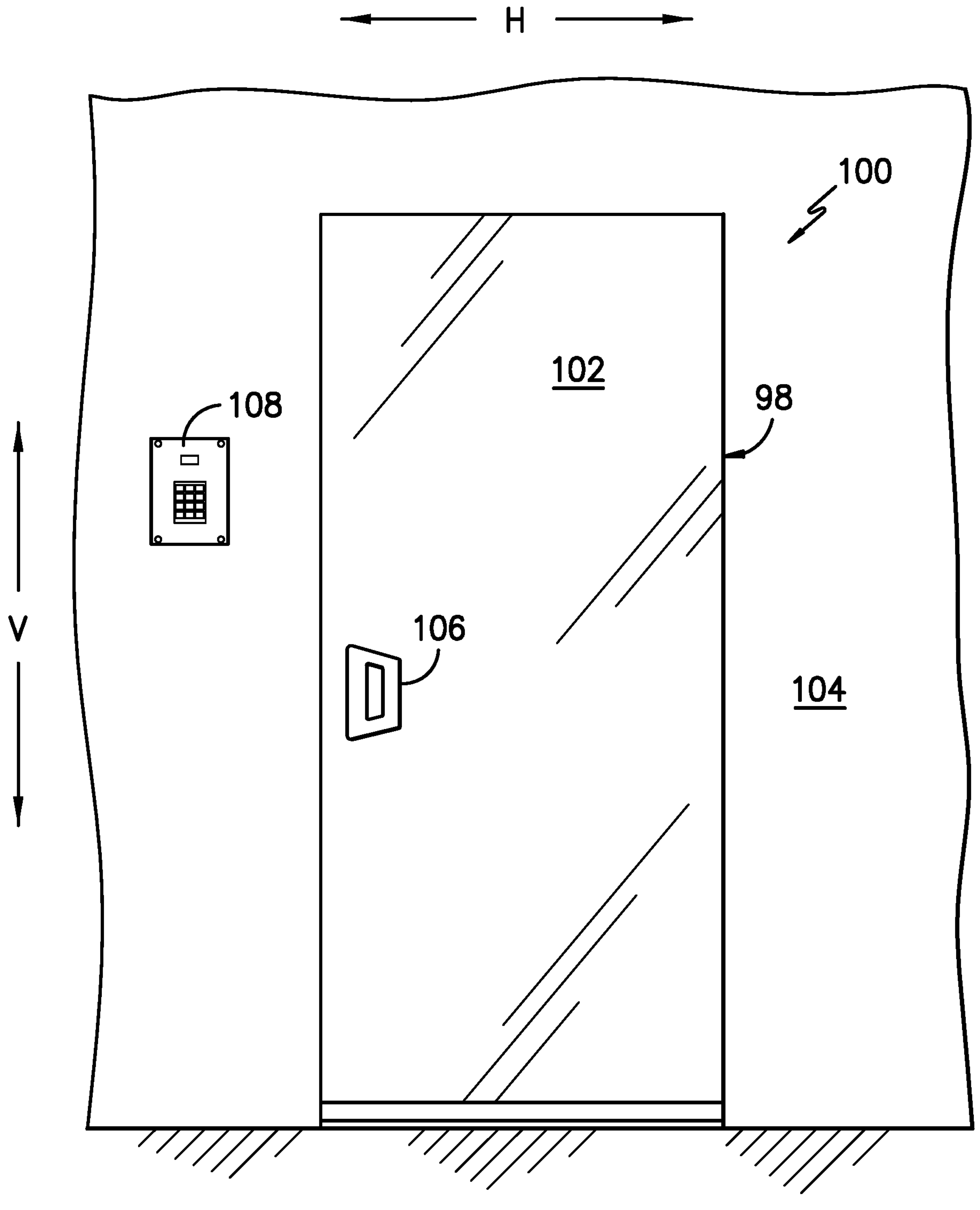
FIG. 1 is a front view of exemplary refrigerated unit installed at an exterior wall of a building or dwelling.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention may be utilized with refrigerated appliances as commonly found in a residential or commercial kitchen as well as with temperature-controlled delivery boxes or containers. As used herein, refrigerated unit includes each of these configurations along with stationary and portable versions of the same. For stationary versions, the present invention includes refrigerated units located within the interior of a structure as well as along an exterior wall. The door for such configurations may pivot along a vertical axis (e.g., a refrigerator installed in a home) or along a horizontal axis (e.g., a lid on a portable container). Other configurations are also included with the scope of the claims that follow.

Figure 2:
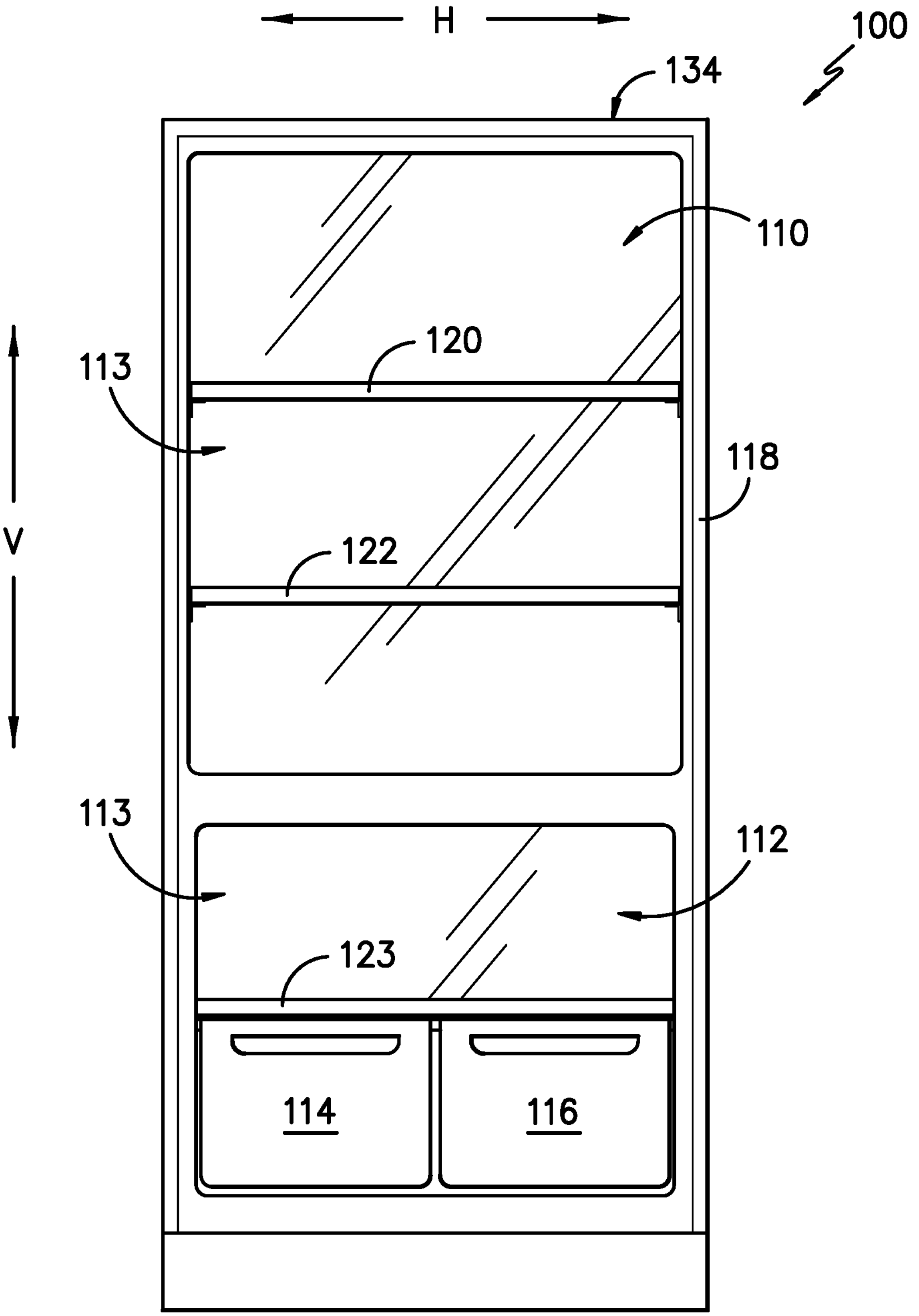
FIG. 2 is front view of the exemplary refrigerated unit without a door for purposes of illustration.

FIG. 1 illustrates an exemplary refrigerated unit 100 of the present invention positioned within an opening 98 of an exterior wall 104 of a building such as a user's home. FIG. 2 shows an exemplary interior space 113 for refrigerated unit 100 divided, for this embodiment, between an upper compartment 110 and a lower compartment 112 positioned within a cabinet 118. Upper compartment 110 is equipped with shelves 120 and 122 whereas lower compartment 112 is provided with a shelf 123 and drawers 114, 116. Other configurations may also be used including single or multiple compartments, other drawer and/or shelf combinations, and a portable or stationary cabinet.

Figure 5:
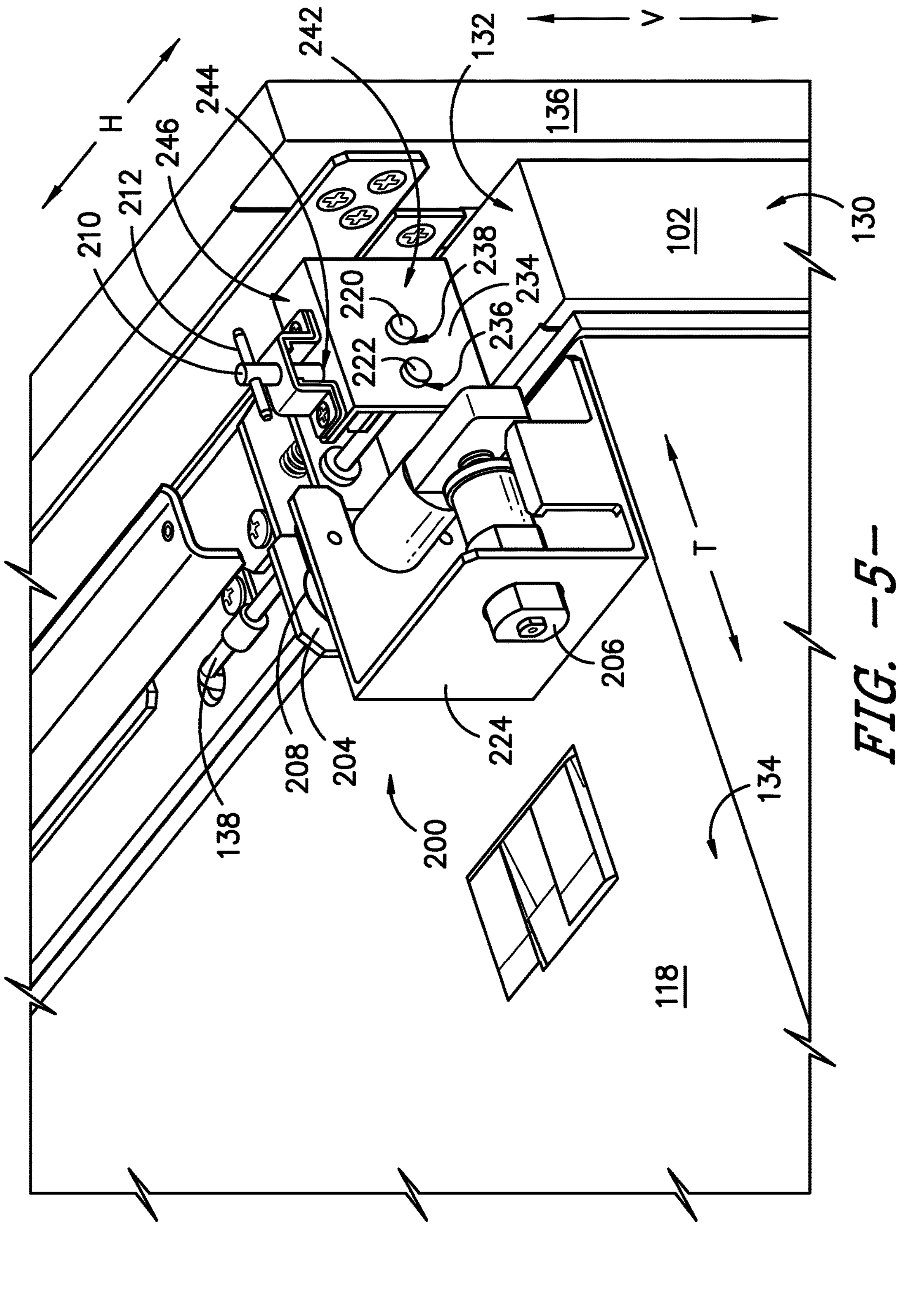
FIG. 5 is a side and perspective view of the exemplary locking mechanism of FIG. 4.

Refrigerated unit 100 includes a door 102, supported by cabinet 118, that pivots between an open position and a closed position. More particularly, door 102 allows a user to selectively access interior space 113 by movement of door 102 between a closed position as shown in FIG. 1 and an open position where interior space 113 as shown in FIG. 2 may be readily accessed. A handle 106 is provided for manipulating door 102. A decorative door panel 136 (FIG. 5) may be added to door 102. The present invention is not limited to any particular size, exterior appearance, or interior configuration, and refrigerated unit 100 with interior space 113 is provided by way of example only.

Refrigerated unit 100 is also equipped with components for cooling compartments 110 and 112 to the same or different temperatures (as may be selected by the user) including temperatures below the freezing point of water. Such may be accomplished using, for example, a heat pump system that includes a condenser and evaporator but other systems may be used as well. These components are not illustrated as such will be understood by one of ordinary skill in the art and are not necessary for understanding the present invention.

For purposes of securing access to the contents, refrigerated unit 100 is configured with a security control pad 108 that controls a lock mechanism 200 later described herein as shown in FIGS. 3 through 9. As will be understood of one of skill in the art, security control pad 108 can be programmed with one or more codes for unlocking door 102 of refrigerated unit 100. The user can, for example, provide such code to a service that delivers food items even when the user is away. The delivery service can access the interior space 113 of refrigerated unit 100 to stock various food items and then close door 102 to secure the same using lock mechanism 200. The present invention is not limited to use with security control pad 108 and other configurations for controlling lock mechanism 200 may be used including manual locking and unlocking systems. The lock mechanism 200 may also be installed on a portable, refrigerated unit.

Figure 3:
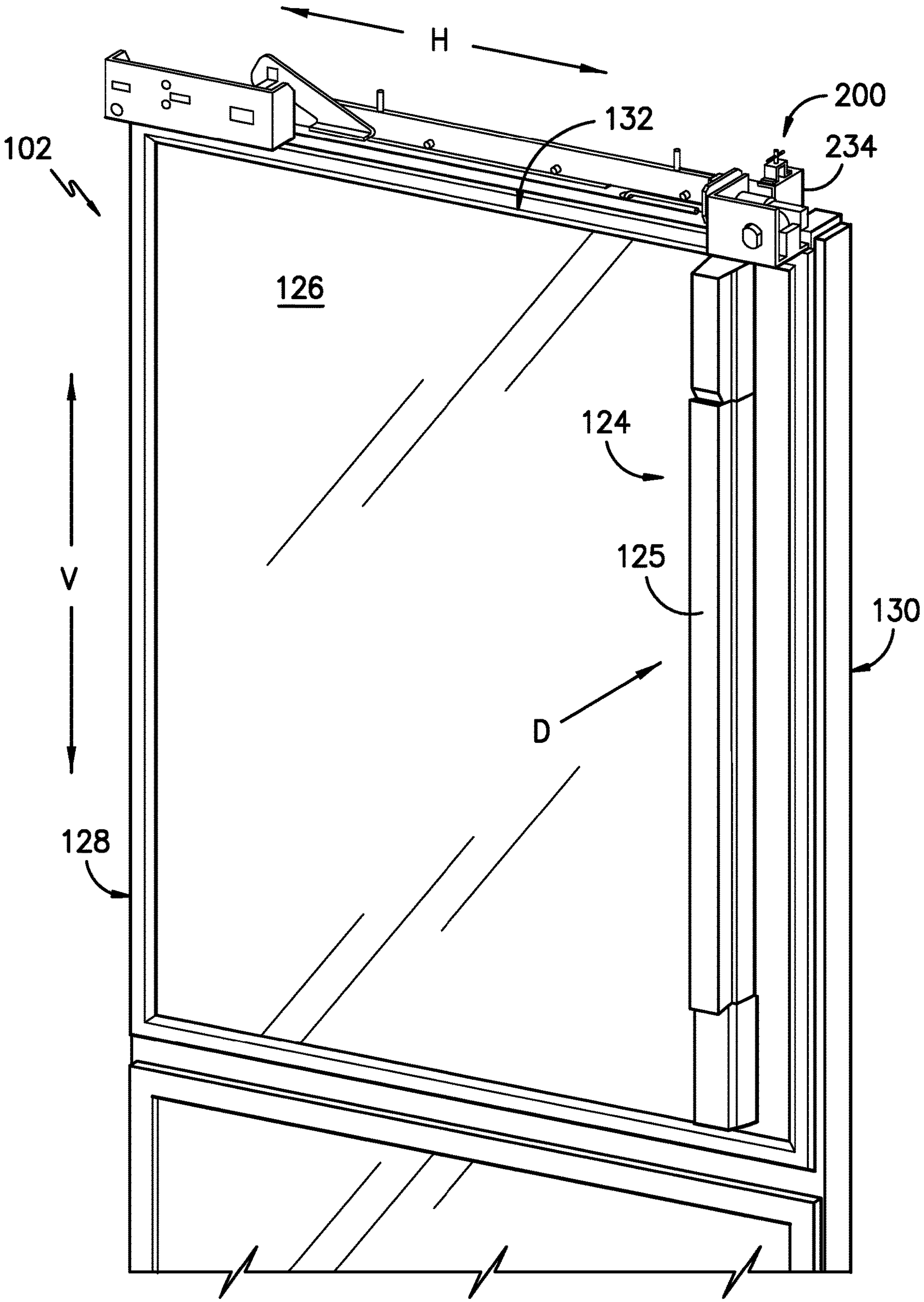
FIG. 3 is a rear view of a portion of the door of the exemplary refrigerated unit.

FIG. 3 illustrates a rear view of door 102 with a rear door surface 126 located between a hinge side 128 and handle side 130 of door 102. An internal door release 124 with handle 125 is positioned on rear door surface 126 and is accessible from interior space 113. A person located within interior space 113 can depress (arrow D) handle 125. This in turn will cause locking mechanism 200 to unlock whereby the person can escape from interior space 113.

FIGS. 4 through 9 illustrate various views of an exemplary embodiment of locking mechanism 200 as will be further used to describe the present invention. While shown positioned at the top side 132 and 134 of door 102 and cabinet 118, respectively, the present invention is not limited to this particular location. Other arrangements may be utilized and are with the scope of the claims that follow as will be understood by one of skill in the art using the teachings disclosed herein.

Figure 4:
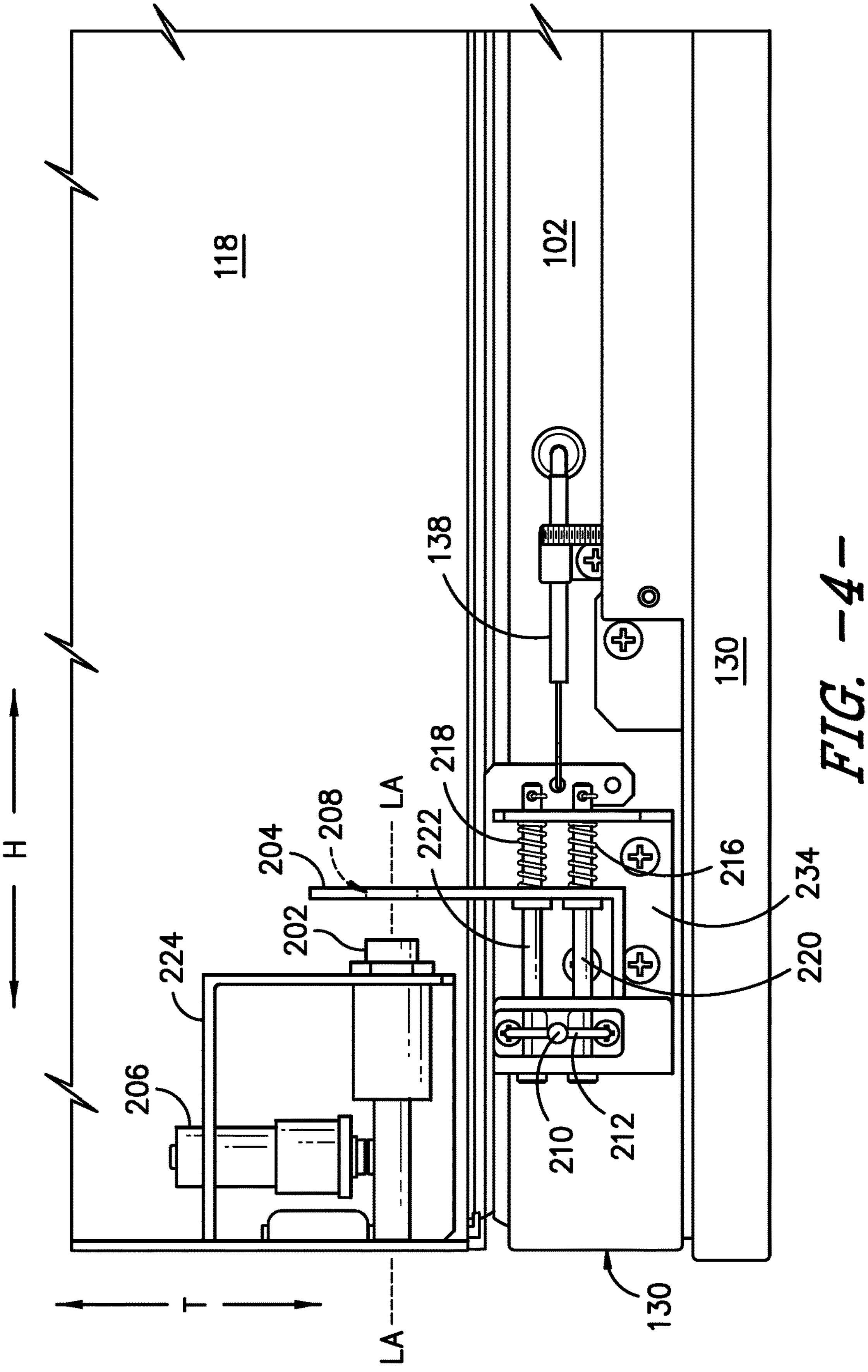
FIG. 4 is top view of the exemplary locking mechanism shown on an exemplary refrigerated unit of the present invention with the mechanism shown in an unlocked position.
Figure 6:
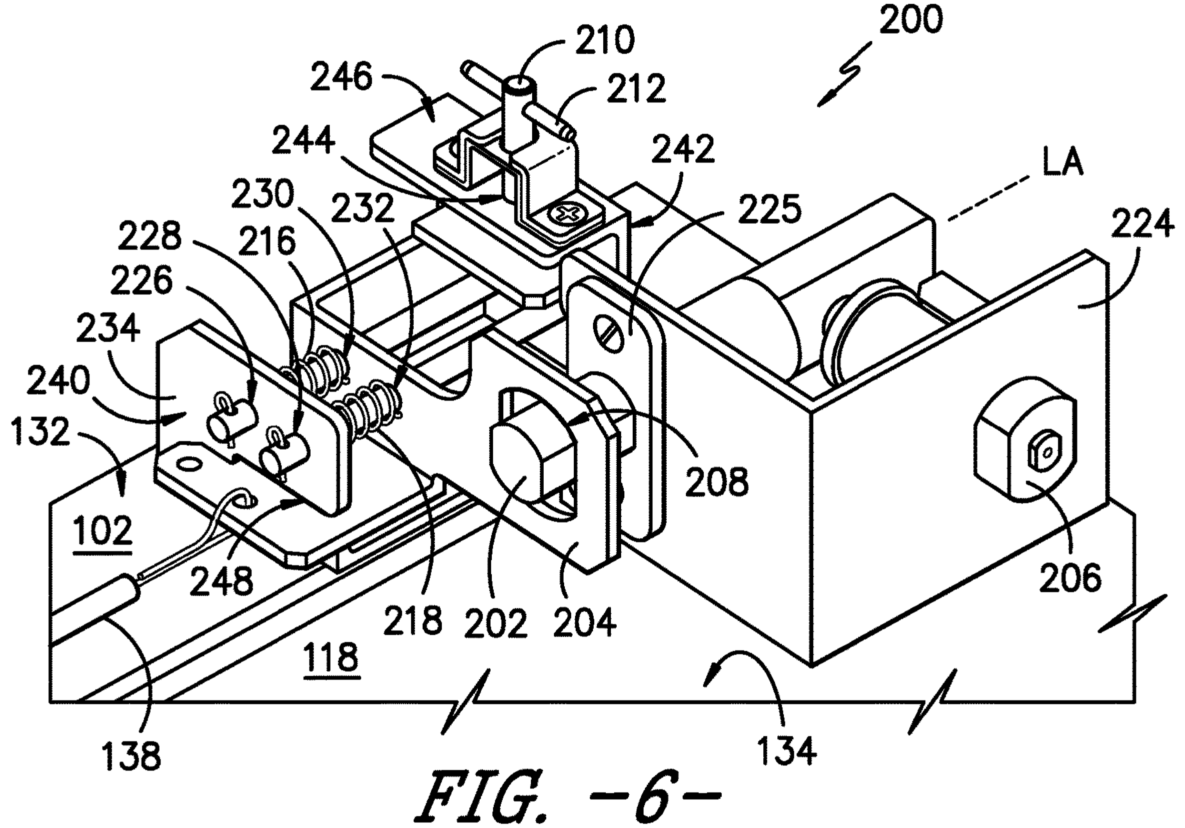
FIGS. 6 and 7 are perspective views of the exemplary locking mechanism and as seen from another side of the exemplary refrigerated unit with FIG. 6 showing a locked position and FIG. 7 showing an unlocked position.
Figure 7:
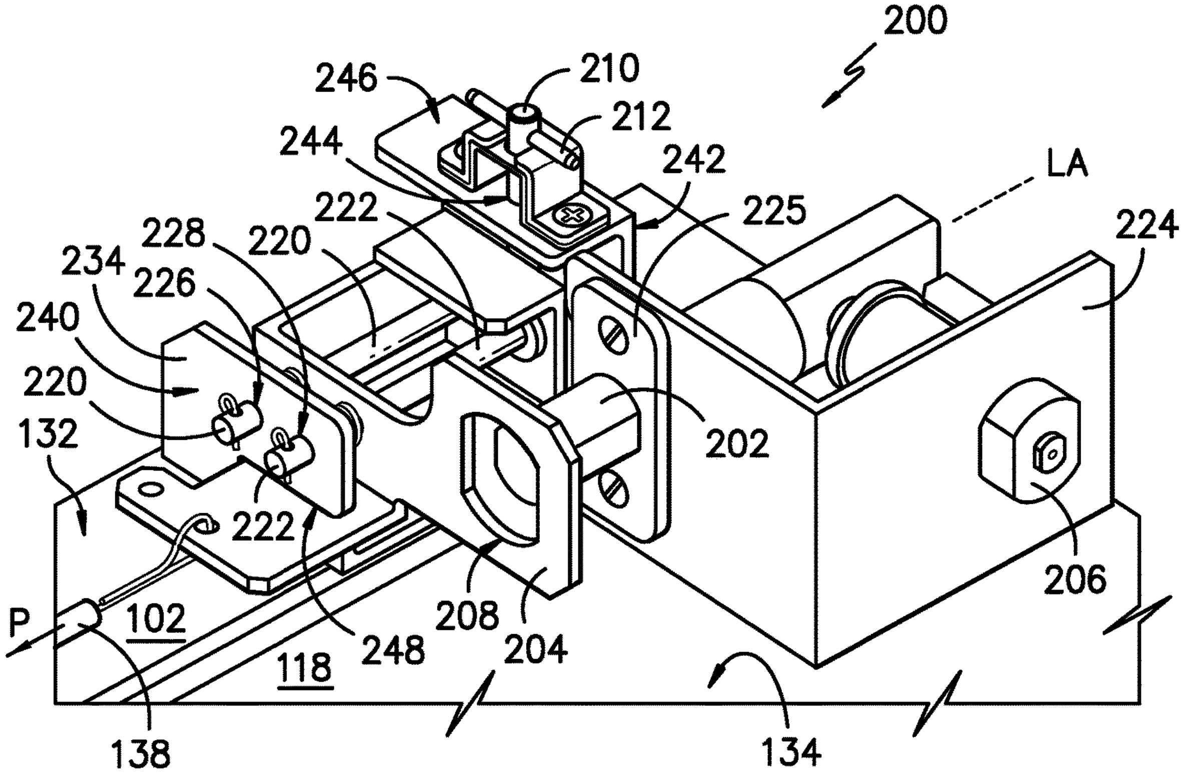

For this exemplary embodiment, locking mechanism 200 includes a shaft or deadbolt 202 that can extend along a lock axis LA between a retracted position shown in FIG. 4 and an extended position shown in FIGS. 6, 7, 8, and 9. When in the extended position, a latch plate 204 interacts with deadbolt 202 to normally prevent door 102 from being opened—thereby securing the contents of interior space 113. Deadbolt 202 is secured to a deadbolt mounting bracket 224 by mounting plate 225 (FIGS. 6 and 7). Deadbolt mounting bracket 224, in this embodiment, is carried on the top side 134 of cabinet 118.

A motor 206 is carried by deadbolt mounting bracket 224 and is connected with deadbolt 202. Motor 206 can be activated by, for example, security control pad 108 to move deadbolt 202 along lock axis LA between the extended and retracted position. Other mechanisms, including manual activation, can be utilized as well in other embodiments of the invention.

Figure 9:
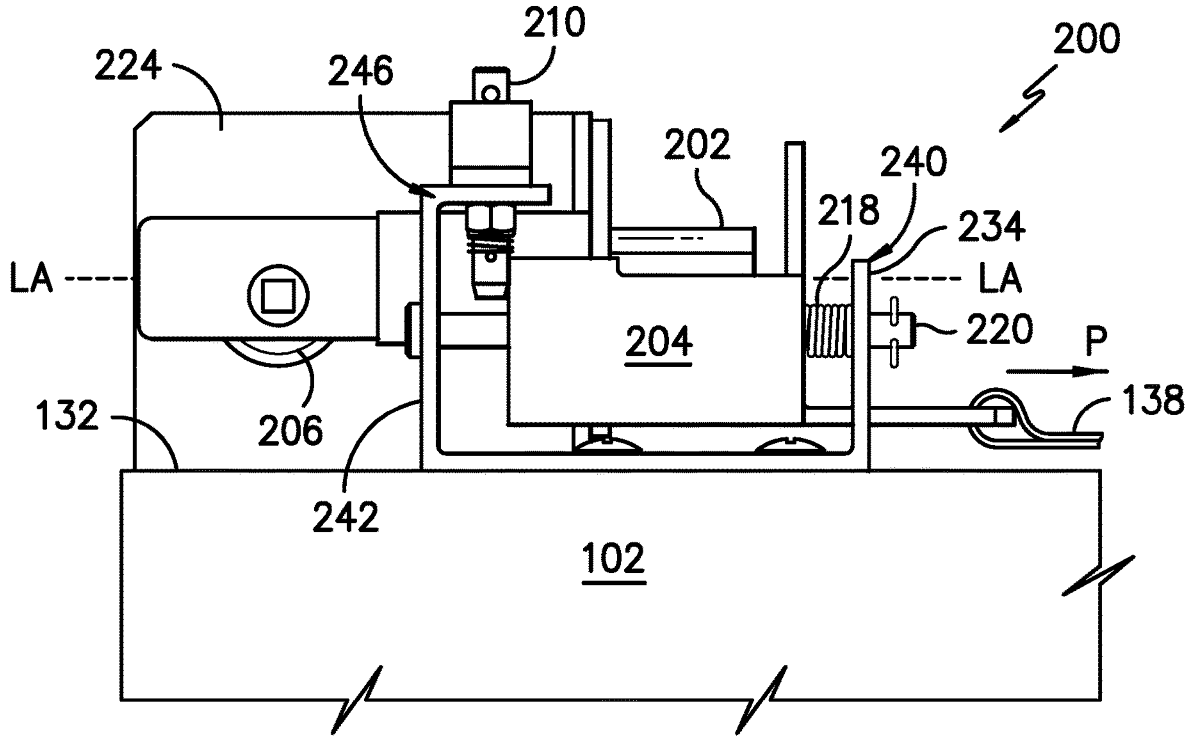

When in the extended position, deadbolt 202 is normally received within an aperture 208 defined by a latch plate 204 carried on the top side 132 of door 102 (FIGS. 6, and 9). Latch plate 204 is positioned near deadbolt 202 when door 102 is in a closed position. When deadbolt 202 is in the extended position, latch plate 204 contacts deadbolt 202 if there is an attempt to open door 102 so as to maintain door 102 in a closed position. If deadbolt 202 is withdrawn to the retracted position and out of aperture 208, then deadbolt 202 can no longer interfere with the movement of latch plate 204 and, in such mode, door 102 may be readily opened.

As previously described, a person pressing on handle 125 of internal door release 124 will unlock door 102. Latch plate 204 is movable along a direction parallel to lock axis LA between an engaged position (FIGS. 6 and 8) and a disengaged position (FIGS. 7 and 9). In the engaged position, deadbolt 202 can be moved along lock axis LA, by motor 206, both in and out of aperture 208 of latch plate 204 so as to lock and unlock door 102. In the disengaged position, deadbolt 202 cannot be moved in and out of aperture 208 and thus door 102 cannot be locked when latch plate 204 is disengaged. Handle 125 is connected with a cable 138 that will pull latch plate 204 (arrow P in FIGS. 7 and 9) from the engaged position to the disengaged position when handle 125 is pressed.

At least one latch biasing element or spring is used to urge latch plate 204 into the engaged position. For this embodiment, the latch plate 204 is urged into the engaged position by a pair of compression springs 216 and 218 that are supported on a pair of guide rods 220 and 222. Latch plate 204 can move or ride along a direction parallel to lock axis LA. More specifically, latch plate 204 moves within a slot 248 defined by a pin support bracket 234 and moves along the pair of guide rods 220 and 222. Rods 220 and 222 extend through guide holes 230 and 232 defined by latch plate 204 (FIGS. 6 and 7). When handle 125 is pressed, cable 138 pulls latch plate 204 away from deadbolt 202, thereby compressing springs 216 and 218. This compression pushes latch plate 204 back towards the engaged position so that door 102 can be locked as previously described. While a pair of springs and guides rods are shown for this particular embodiment, other configurations (including only one spring and one guide rod) may also be used in other embodiments of the invention as will be understood by one of skill in the art using the teachings disclosed herein.

Pin support bracket 234 is positioned on door 102 and includes a first vertical portion 240 having a pair of openings 226 and 228 for receipt of one end each of guide rods 220 and 222. A second vertical portion 242 defines a pair of openings 236 and 238 for receipt of opposing ends of guide rods 220 and 222. Unlike latch plate 204, pin support bracket 234 is not movable relative to guide rods 220 and 222.

Figure 8:
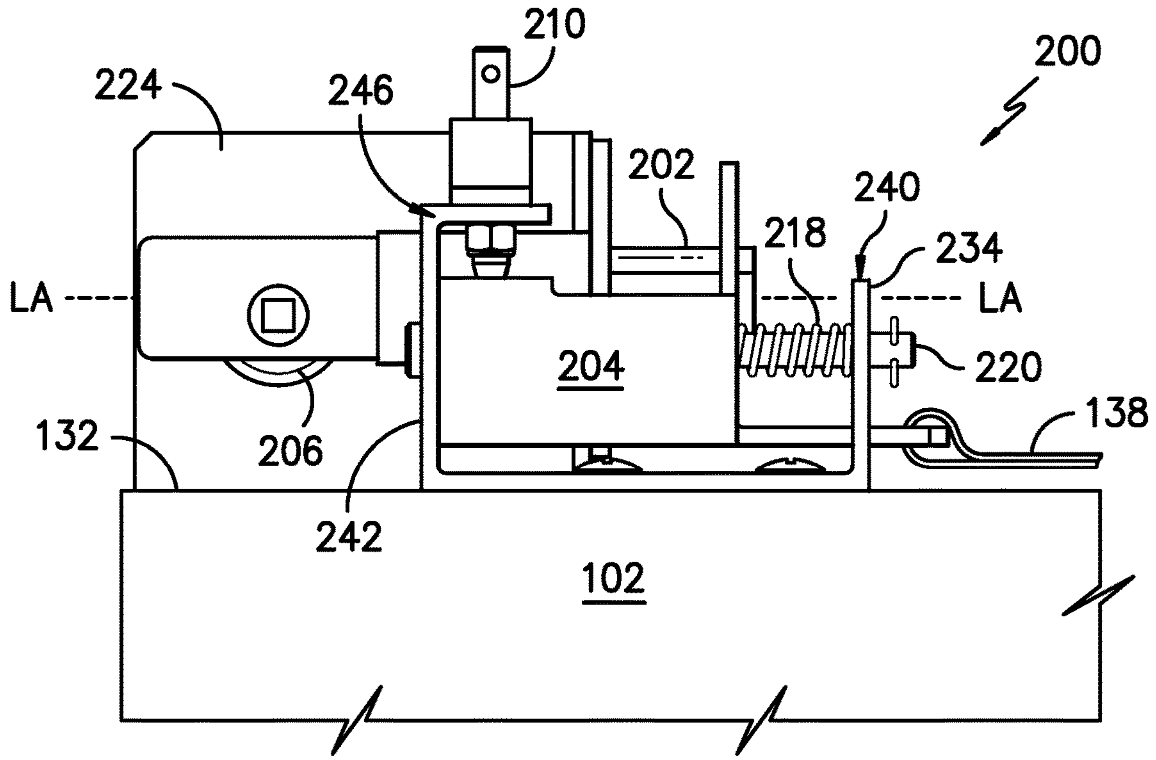

A pin 210 with handle 212 is positioned by pin support bracket 234 near latch plate 204. Pin 210 is configured for movement between an activated state (FIGS. 7 and 9) and a deactivated state (FIGS. 6 and 8). In the activated state, pin 210 blocks the movement of latch plate 204 into the engaged position—thereby ensuring the latch plate 204 remains in the disengaged position. In the deactivated state, latch plate 204 is not prevented from movement into the engaged position. For this embodiment, pin 210 is supported by bracket 234 and extends vertically through an opening 244 in the top 246 of pin support bracket 234. A comparison of FIGS. 8 and 9 best illustrates how pin 210 blocks (by contact) the movement of latch plate 204 into the engaged position (FIG. 8) when pin 210 is in the activated stated (FIG. 9).

Without the presence of pin 210, a person would be required to apply constant pressure to handle 125 so as to keep springs 216 and 218 compressed and maintain latch plate 204 in the disengaged position of FIGS. 7 and 9. However, for this embodiment of the invention, when handle 125 is pressed and latch plate 204 is pulled into the disengaged position, gravity causes pin 210 to drop into an activated state whereby latch plate 204 is prevented from moving back into the engaged position. As a result, constant pressure on handle 125 is no longer required once it has been pressed enough to move latch plate 204 into the disengaged position. When pin 210 is in this activated state, door 102 can be opened even if deadbolt 202 is in the extended position.

Pin 210 can be reset by pulling upwardly on handle 212 so as to allow latch plate 202 to move back into the engaged position whereby deadbolt 202 can be moved in and out of aperture 208. Pin 210 will remain ready to move into the activated state again if handle 125 is pressed. While this particular embodiment of locking mechanism utilizes gravity to activate pin 210 once handle 125 is pressed, in other embodiments of the invention a spring or other pin biasing element may be used to provide additional force or to allow embodiments where pin 210 may not be vertically oriented. For example, pin 210 could be positioned within a spring that is compressed by movement of pin 210 into the deactivated state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A refrigerated unit, comprising:

a cabinet forming an opening for access to an interior space;

a door supported by the cabinet and configured for allowing selective access by movement of the door between an open position and a closed position;

a locking mechanism for securing the door in the closed position, the locking mechanism comprising a deadbolt movable along a lock axis between a retracted position and an extended position, the deadbolt preventing opening of the door when in the extended position;

a latch plate positioned near the deadbolt when the door is in a closed position, the latch plate defining an aperture for receipt of the deadbolt when in the extended position, the latch plate movable along a direction parallel to the lock axis between i) an engaged position where the deadbolt can move along the lock axis in and out of the aperture and ii) a disengaged position where the deadbolt cannot be positioned into the aperture; and a pin positioned near the latch plate, the pin configured for linear movement along a direction orthogonal to the lock axis between an i) activated state where the latch plate is prevented from moving to the engaged position and ii) a deactivated state where the latch plate is not prevented from being in the engaged position;

at least one latch biasing element connected with the cabinet and configured to urge the latch plate into the engaged position;

a pin support bracket carried on the door near the pin; and at least one guide rod extending from the pin support bracket towards the pin and through a guide hole in the latch plate such that latch plate rides along the at least one guide rod when moving between the engaged position and the disengaged position.

2. The refrigerated unit of claim 1, further comprising a pin biasing element connected with the pin and configured to urge the pin into the activated state.

3. The refrigerated unit of claim 1, further comprising an internal door release positioned on an inside surface of the door and located in the interior space of the cabinet when the door is in the closed position, the internal door release connected with the latch plate, wherein activation of the internal door release moves the latch plate to the disengaged position and allows the pin to move into the activated position.

4. The refrigerated unit of claim 1, wherein the at least one latch biasing element comprises a spring supported on the at least one guide rod.

5. The refrigerated unit of claim 1, wherein the at least one guide rod comprises a pair of guide rods extending from the pin support bracket towards the pin and through a pair of guide holes in the latch plate such that latch plate rides along the pair of guide rods when moving between the engaged position and the disengaged position; and wherein the at least one latch biasing element comprises a pair of springs supported on the pair of guide rods.

6. The refrigerated unit of claim 1, further comprising:

a motor for moving the deadbolt between the retracted position and the extended position, wherein the motor and deadbolt are supported by the cabinet.

7. The refrigerated unit of claim 1, wherein the pin includes a handle to that a user can move pin into deactivated position.

8. The refrigerated unit of claim 1, further comprising:

a motor for moving the deadbolt between the retracted position and the extended position, wherein the motor and deadbolt are supported by the cabinet; and a security control pad connected with the motor and configured to activate the motor once a user enters an authorized code.

9. A refrigerated unit, comprising:

a cabinet forming an opening for access to an interior space;

a door pivotably supported and configured for selectively covering and uncovering the opening so that the interior space may be accessed;

a locking mechanism comprising a deadbolt movable along a lock axis between a retracted position and an extended position, the deadbolt preventing opening of the door when in the extended position;

a latch plate positioned near the deadbolt when the door is in a closed position, the latch plate defining an aperture for receipt of the deadbolt when in the extended position, the latch plate movable between i) an engaged position where the deadbolt can move along the lock axis in and out of the aperture and ii) a disengaged position where the deadbolt cannot be positioned into the aperture;

a pin positioned near the latch plate, the pin configured for movement along a direction orthogonal to the lock axis between an i) activated state where the latch plate is prevented from moving to the engaged position and ii) a deactivated state where the latch plate is not prevented from moving into the engaged position;

a pair of guide rods supporting the latch plate and along which the latch plate is movable; and a pair of springs supported on the guide rods and configured to urge the latch plate into the engaged position.

10. The refrigerated unit of claim 9, further comprising a pin support bracket that positions the pin near the latch plate.

11. The refrigerated unit of claim 10, wherein the pin support bracket defines holes for the receipt of the pair of guide rods.

12. The refrigerated unit of claim 11, wherein the pin support bracket defines a slot for receipt of the latch plate and within which the latch plate can slide between the engaged position and the disengaged position.

13. The refrigerated unit of claim 12, wherein the latch plate is mounted upon the door.

14. The refrigerated unit of claim 13, further a deadbolt mounting bracket attached to the cabinet and upon which the deadbolt is secured.

* * * * *